United States Patent
Uhm et al.

(10) Patent No.: US 9,899,682 B2
(45) Date of Patent: Feb. 20, 2018

(54) ELECTRODE INCLUDING COATING LAYER FOR PREVENTING REACTION WITH ELECTROLYTE SOLUTION

(71) Applicant: LG Chem, Ltd., Seoul (KR)

(72) Inventors: In Sung Uhm, Daejeon (KR); Je Young Kim, Daejeon (KR); Ji Yoon Kwon, Daejeon (KR); Kyoung Ho Kim, Daejeon (KR); Hoe Jin Hah, Daejeon (KR); Il Hong Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/892,106

(22) PCT Filed: Jul. 29, 2014

(86) PCT No.: PCT/KR2014/006911
§ 371 (c)(1),
(2) Date: Nov. 18, 2015

(87) PCT Pub. No.: WO2015/016563
PCT Pub. Date: Feb. 5, 2015

(65) Prior Publication Data
US 2016/0149220 A1  May 26, 2016

(30) Foreign Application Priority Data
Jul. 30, 2013 (KR) .......... 10-2013-0090027

(51) Int. Cl.
*H01M 4/00* (2006.01)
*H01M 4/62* (2006.01)
(Continued)

(52) U.S. Cl.
CPC .......... *H01M 4/628* (2013.01); *C25D 3/44* (2013.01); *H01M 4/045* (2013.01);
(Continued)

(58) Field of Classification Search
CPC .. H01M 4/0452; H01M 4/131; H01M 4/1391; H01M 4/62; H01M 4/045; H01M 4/628; H01M 2220/20; C25D 3/44
See application file for complete search history.

(56) References Cited

U.S. PATENT DOCUMENTS 4,911,996 A    3/1990  Holleck et al.
5,505,823 A *  4/1996  Rendall .................... C25C 3/06
                                                       205/354
(Continued)

FOREIGN PATENT DOCUMENTS

CN    1784512       6/2006
CN    101356671 A   1/2009
(Continued)

OTHER PUBLICATIONS

International Search Report for Application No. PCT/KR2014/006911 dated Nov. 18, 2014.
(Continued)

*Primary Examiner* — Mark F. Huff
*Assistant Examiner* — Monique M Wills
(74) *Attorney, Agent, or Firm* — Lerner, David, Littenberg, Krumholz & Mentlik, LLP

(57) ABSTRACT

Disclosed is an electrode for secondary batteries in which an electrode mix layer including an electrode active material is coated on an electrode collector, and a coating layer including aluminum (Al) and/or alumina ($Al_2O_3$) is formed on the electrode mix layer.

22 Claims, 1 Drawing Sheet

(51) Int. Cl.
    *H01M 4/04*          (2006.01)
    *H01M 4/131*        (2010.01)
    *H01M 4/1391*      (2010.01)
    *C25D 3/44*          (2006.01)
    *H01M 4/58*          (2010.01)
    *H01M 10/0525*     (2010.01)

(52) U.S. Cl.
    CPC ......... *H01M 4/0452* (2013.01); *H01M 4/131* (2013.01); *H01M 4/1391* (2013.01); *H01M 4/582* (2013.01); *H01M 4/5825* (2013.01); *H01M 4/62* (2013.01); *H01M 10/0525* (2013.01); *H01M 2220/20* (2013.01); *H01M 2220/30* (2013.01)

(56) References Cited

U.S. PATENT DOCUMENTS

| | | | |
|---|---|---|---|
| 2004/0029014 A1 | 2/2004 | Hwang et al. | |
| 2004/0173468 A1 | 9/2004 | Henuset | |
| 2006/0257746 A1* | 11/2006 | Inagaki | C01G 23/00 |
| | | | 429/231.5 |
| 2008/0248391 A1 | 10/2008 | Wakasugi et al. | |
| 2009/0181300 A1 | 7/2009 | Kim | |
| 2009/0197181 A1 | 8/2009 | Sakitani et al. | |
| 2010/0012886 A1 | 1/2010 | Ryu et al. | |
| 2010/0136394 A1 | 6/2010 | Miyahisa et al. | |
| 2010/0273045 A1 | 10/2010 | Hasegawa et al. | |
| 2011/0111302 A1 | 5/2011 | Sato et al. | |
| 2011/0311869 A1 | 12/2011 | Oh et al. | |
| 2012/0328941 A1* | 12/2012 | Hosoe | H01G 9/016 |
| | | | 429/211 |
| 2013/0089786 A1* | 4/2013 | Jeong | H01M 4/48 |
| | | | 429/221 |
| 2013/0130083 A1 | 5/2013 | Park et al. | |
| 2014/0178760 A1* | 6/2014 | Bowling | H01M 4/131 |
| | | | 429/221 |

FOREIGN PATENT DOCUMENTS

| | | |
|---|---|---|
| CN | 101496200 | 7/2009 |
| JP | H01304660 A | 12/1989 |
| JP | 2004228059 A | 8/2004 |
| JP | 2009170421 A | 7/2009 |
| JP | 2009211824 A | 9/2009 |
| JP | 2009302009 A | 12/2009 |
| JP | 2011210549 A | 10/2011 |
| KR | 20040013585 A | 2/2004 |
| KR | 20090013661 A | 2/2009 |
| KR | 20090100398 A | 9/2009 |
| KR | 20110097719 A | 8/2011 |
| KR | 20120137289 A | 12/2012 |
| WO | 2009078159 A1 | 6/2009 |

OTHER PUBLICATIONS

Myung, Seung-Taek et al., "Role of Alumina Coating on Li—Ni—Co—Mn—O Particles as Positive Electrode Material for Lithium-Ion Batteries" Chemistry of materials, Jun. 15, 2005, vol. 17, No. 14, pp. 3695-3704, See abstract and pp. 3699, 3701-3704.

Bettge et al., "Improving high-capacity Li 1.2Ni0.15Mn0.55Co0.1O2-based lithium-ion cells by modifying the positive electrode with alumina", Journal of Power Sources 233, Jan. 29, 2013, pp. 346-357.

Chinese Search Report for Application No. 201480028647.3 dated Jan. 23, 2017.

Lian et al., "Fe-doping effects on the structural and electrochemical properties of 0.5Li2MnO3.0.5LiMn0.5Ni0.5O2 electrode material", J. Appl. Electrochem, Published online: Apr. 26, 2012, 42:409-417.

Search Report from European Application No. 14831897.5, dated Nov. 22, 2016.

Liu et al.; "Conductive Surface Modification With Aluminum of High Capacity Layered Li[Li0.2Mn0.54Ni0.13Co0.13] O2 Cathodes", J. Phys Chem C, May 2010, pp. 9528-9533, vol. 114, No. 20.

* cited by examiner

[FIG. 1]
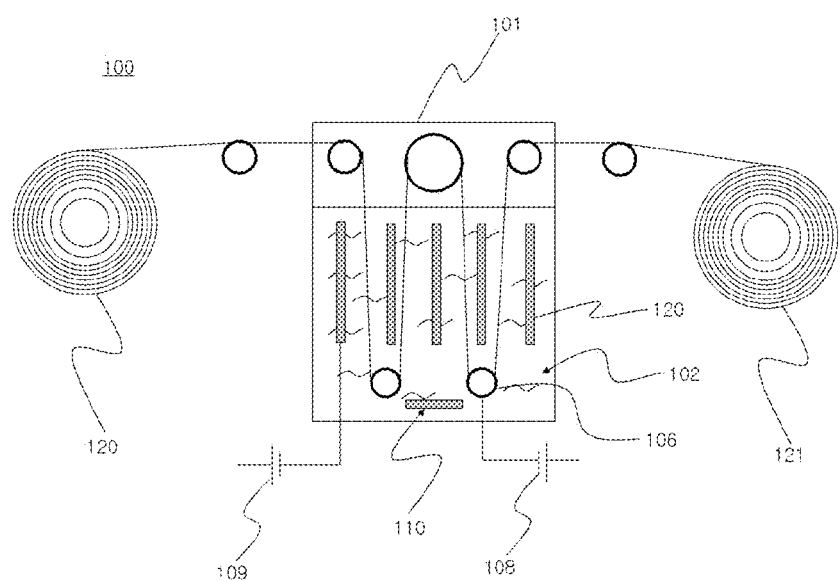
[FIG. 2]
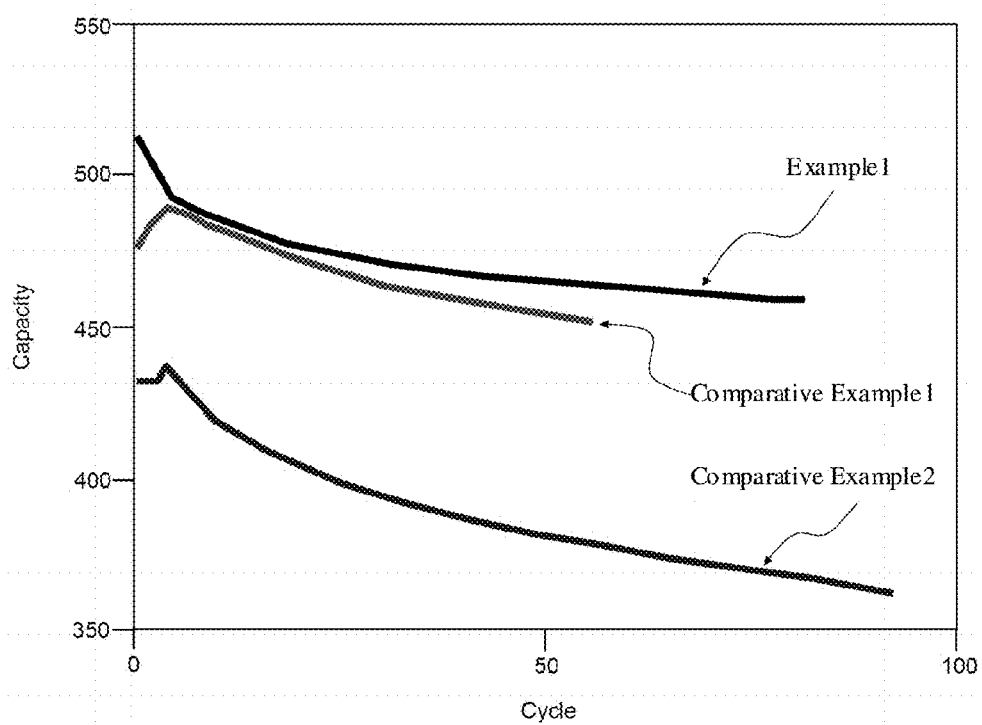

ELECTRODE INCLUDING COATING LAYER FOR PREVENTING REACTION WITH ELECTROLYTE SOLUTION

CROSS REFERENCE TO RELATED APPLICATIONS

The present application is a national phase entry under 35 U.S.C. § 371 of International Application No. PCT/KR2014/006911, filed Jul. 29, 2014, which claims priority from Korean Patent Application No. 10-2013-0090027, filed Jul. 30, 2013, the disclosures of which are incorporated herein by reference.

TECHNICAL FIELD

The present invention relates to an electrode in which a coating layer for preventing reaction with an electrolyte solution is formed.

BACKGROUND ART

As mobile device technology continues to develop and demand therefor continues to increase, demand for secondary batteries as energy sources is rapidly increasing. Among these secondary batteries, lithium secondary batteries which exhibit high energy density and voltage, long lifespan and low self-discharge rate are commercially available and widely used.

As positive electrode active materials for such lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure and the like, and lithium-containing nickel oxides such as $LiNiO_2$ is also under consideration.

In particular, lithium manganese oxides, such as $LiMnO_2$, $LiMn_2O_4$, and the like, are advantageous in that they contain Mn, which is an abundant and environmentally friendly raw material, and thus are drawing much attention as a positive electrode active material that can replace $LiCoO_2$.

However, since lithium manganese oxides such as $LiMnO_2$ and $LiMn_2O_4$ cause rapid exhaustion of an electrolyte solution through reaction with an electrolyte solution, with increasing number of cycles, lifespan and cycle characteristics of secondary batteries may be deteriorated. In addition, the volumes of secondary batteries expand due to generation of a large amount of gas, elution of manganese, etc.

Meanwhile, as lithium-containing manganese oxides, there is $Li_2MnO_3$ in addition to $LiMnO_2$ and $LiMn_2O_4$. Since structural stability of $Li_2MnO_3$ is excellent but it is electrochemically inactive, $Li_2MnO_3$ itself cannot be used as a positive electrode active material of secondary batteries. Therefore, some prior technologies suggest a technology of using a solid solution of $Li_2MnO_3$ and $LiMO_2$ (M=Co, Ni, $Ni_{0.5}Mn_{0.5}$, Mn) as a positive electrode active material. In such a positive electrode active material solid solution, Li and O are separated from a crystal structure at a high voltage of 4.5 V and, thus, electrochemical activity is exhibited. However, there are unsolved problems such as exhaustion of an electrolyte solution and volume expansion of secondary batteries, due to easy reaction with an electrolyte solution at high voltage.

Accordingly, there is an urgent need for technology to inhibit reaction of an active material and an electrolyte solution and ultimately to improve lifespan and cycle characteristics of secondary batteries.

DISCLOSURE

Technical Problem

Therefore, the present invention has been made to solve the above problems and other technical problems that have yet to be resolved.

As a result of a variety of extensive and intensive studies and experiments, the inventors of the present invention confirmed that desired effects may be accomplished by forming a coating layer including aluminum (Al) and/or alumina ($Al_2O_3$) on an electrode mix layer as described below, thus completing the present invention.

Technical Solution

In accordance with one aspect of the present invention, provided is an electrode for secondary batteries, in which an electrode mix layer including an electrode active material is coated on an electrode collector and a coating layer including aluminum (Al) and/or alumina ($Al_2O_3$) is formed on the electrode mix layer.

Such a coating layer may prevent reaction of the electrode active material and an electrolyte solution, whereby conventional problems described above may be resolved.

The coating layer may be formed to a thickness of 0.5 nm to 100 nm, and the coating layer may be partially or entirely formed on a surface of the electrode mix layer.

Here, when the thickness of the coating layer is 0.5 nm or less, effects due to the coating layer are minor. When the thickness of the coating layer is 100 nm or more, migration of lithium ions is limited, thereby deteriorating electrode performance.

In addition, the coating layer may be partially or entirely formed on a surface of the electrode mix layer. In detail, the coating layer may be formed in an area of 100% to 50% with respect to a surface area of the electrode mix layer.

When the area of the coating layer is 50% or less, a reaction distance between oxygen and aluminum increases, whereby it is impossible to trap generated oxygen and to suppress oxidation of the electrolyte solution at high voltage.

In a non-limiting embodiment, the coating layer may include aluminum and alumina.

In this case, the aluminum and the alumina in the coating layer form a concentration gradient with respect to a thickness direction.

As an embodiment of the structure, in the coating layer, the amount of aluminum may decrease and the amount of alumina may increase, toward a surface portion of the electrode from a side contacting the electrode mix layer.

On the other hand, as another embodiment of the structure, in the coating layer, the amount of aluminum may decrease and the amount of alumina may increase, toward a side contacting the electrode mix layer and a surface portion of the electrode from the center of the coating layer.

In a non-limiting embodiment, the coating layer may be uniformly formed through electrolytic decomposition, and, in the electrolytic decomposition, an aluminum precursor is ionized in a solution for electrolytic decomposition and is reduced to aluminum metal in an electrolytic electrode.

The electrolytic electrode is a reduction electrode that deposits aluminum metal on a surface and is distinguished from the electrode for secondary batteries according to the present invention.

The solution may dissolve an aluminum precursor and is a stable material that is neither oxidized nor reduced at 1.5 V and at less than 4.6 V with respect to lithium. In detail, the solution may be at least one solvent selected from cyclic carbonate, cyclic ester, linear carbonate or linear ester.

The aluminum precursor may be $AlCl_3$, but the present invention is not limited thereto.

In a non-limiting embodiment, the electrolytic decomposition may be performed through a catalyst. The catalyst may be at least one catalyst selected from the group consisting of $ZnCl_2$, $CoCl_2$, $MnCl_2$, $NiCl_2$, and $SnCl_2$ based catalysts, but the present invention is not limited thereto.

Meanwhile, the electrode may be a positive electrode, and the electrode active material may include a lithium transition metal oxide represented by Formula 1 or 2 below.

$$Li_xM_yMn_{2-y}O_{4-z}A_z \quad (1),$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \leq x \leq 1.2$, $0 < y < 2$, and $0 \leq z < 0.2$.

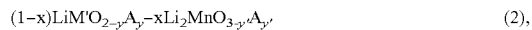

$$(1-x)LiM'O_{2-y}A_y - xLi_2MnO_{3-y'}A_{y'} \quad (2),$$

wherein M' is $Mn_aM_b$;

$M_b$ is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0 < x < 1$, $0 \leq y < 0.02$, $0 < y' \leq 0.02$, $0.3 \leq a \leq 1.0$, and $0 \leq b \leq 0.7$, $a+b=1$.

In addition, the present invention provides a method of manufacturing the electrode for secondary batteries.

In particular, the method of manufacturing the electrode for secondary batteries may include:

(i) coating an electrode mix including an electrode active material on a collector;

(ii) preparing a solution including an aluminum precursor; and (iii) coating an electrode mix layer of the coating (i) through electrolytic decomposition using the solution of the preparing (ii);

The aluminum precursor may be $AlCl_3$, but the present invention is not limited thereto.

In the electrolytic decomposition in the coating (iii), an aluminum precursor may be ionized in a solution for electrolytic decomposition, and may be reduced to aluminum metal in an electrolytic electrode.

In this regard, FIG. 1 schematically illustrates an electrolytic decomposition device according to an embodiment of the present invention.

Referring to FIG. 1, an electrolytic decomposition device 100 includes a first roller 120 and a second roller 121 for rolling a positive electrode sheet, an electrolyte solution 102 including an aluminum precursor, an electrolytic bath 101 accommodating the electrolyte solution 102, a reference electrode 110 including an Li or hydrogen reference electrode in order to separate two or more metal types included in the electrolyte solution 102, a positive electrode 122 as a carbon material in which Cl is oxidized, a first battery 109 for supplying current to the positive electrode 122, a negative electrode 106, which is located in the electrolytic bath 101 and deposits Al on a surface of a positive electrode sheet by reducing Al, a negative electrode 106, which rolls the positive electrode sheet within the electrolytic bath 101, as a lithium secondary battery positive electrode material, and a second battery 108 providing current to the negative electrode 106.

A voltage of 4.5 V with respect to lithium is provided to the positive electrode 122 from the first battery 109, and a voltage of 1.4 V with respect to lithium is provided to the negative electrode 106 from the second battery 108. The positive electrode sheet is input inside the electrolytic bath 101 by the first roller 120, a positive electrode sheet within the electrolytic bath 101 is migrated by a migration roller located within the electrolytic bath 101, and the positive electrode sheet is coated with reduced Al at the negative electrode 106 located in a lower portion of the electrolytic bath 101. Subsequently, the positive electrode sheet located outside the electrolytic bath 101 by the migration roller is rolled at a second roller 121.

In the positive electrode, reaction such as $Cl(g) + 2e^- \rightarrow Cl^-$ is performed and $Cl^-$ ions are oxidized. In the negative electrode, reaction such as $Al^{3+}(g) + 3e^- \rightarrow Al$ is performed, and Al is deposited and coated on a surface of the positive electrode sheet.

Meanwhile, in the electrode for secondary batteries according to the present invention, the electrode mix coated with aluminum (Al) and/or alumina ($Al_2O_3$) is coated on the electrode collector, as described above. Accordingly, the present invention provides a secondary battery including the electrode. Here, the secondary battery may be a lithium ion battery, a lithium ion polymer battery or a lithium polymer battery.

In a specific embodiment, the lithium secondary battery is generally composed of a positive electrode, a negative electrode, a separator disposed between the positive electrode and the negative electrode, and a lithium salt-containing non-aqueous electrolyte, and other components of the battery are described below.

In general, the positive electrode is prepared by drying after coating a mixture of a positive electrode active material, a conductive material and a binder, as an electrode mix, on a positive electrode current collector. In this case, as desired, the mixture may further include a filler.

Examples of the positive electrode active material may include, in addition to the lithium transition metal oxide represented by Formula 1 or 2, layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having formula $LiNi_{1-x}M_xO_2$ where M=Co, Mn, Al, Cu, Fe, Mg, B, or Ga, and $0.01 \leq x \leq 0.3$; lithium manganese composite oxides having formula $LiMn_{2-x}M_xO_2$ where M=Co, Ni, Fe, Cr, Zn, or Ta, and $0.01 \leq x \leq 0.1$ or formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % based on the total weight of a mixture including a positive electrode active material. There is no particular limit as to the conductive material, so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fiber and metallic fiber; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The present invention also provides a secondary battery including the electrode, and the secondary battery may be a lithium ion battery, a lithium ion polymer battery, or a lithium polymer battery.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$ The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)$, or the like to a mixed solvent including EC or PC, which is a high dielectric solvent and a cyclic carbonate, and DEC, DMC, or EMC, which is a low viscosity solvent and a linear carbonate.

The present invention provides a battery module including the secondary battery as a unit cell, a battery pack including the battery module, and a device including the battery pack as a power source.

In this regard, particular examples of the device include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view of an electrolytic decomposition device according to an embodiment of the present invention; and FIG. 2 is a graph illustrating results according to Experimental Example 1.

MODE FOR INVENTION

Now, the present invention will be described in more detail with reference to the accompanying drawings. These examples are provided for illustrative purposes only and should not be construed as limiting the scope and spirit of the present invention.

EXAMPLE 1

$0.5Li_2MnO_3 \cdot 0.5LiNi_{0.32}Mn_{0.32}Co_{0.24}O_2$ as an active material, Denka black as a conductive material and PVdF as a binder were added to NMO in a weight ratio of 95:2.5:2.5 and mixed. A resultant mixture was coated on aluminum foil to a thickness of 20 μm, and a rolled and dried electrode sheet was input to an electrolytic solution in which $AlCl_3$ as an aluminum precursor and $ZnCl_2$ as a catalyst were dissolved. Subsequently, electrolytic decomposition was carried out in order to reduce aluminum, and thus, a coating layer including aluminum and alumina was formed on a mix layer to a thickness of 10 nm, thereby manufacturing a positive electrode.

In addition, a natural graphite/Si-based active material was used as a negative electrode, and carbon black as a conductive material, SBR as a binder and CMC as a thickener were added to NMP in a weight ratio of 94:2:3:1 and mixed. A resultant mixture was coated on copper (Cu) foil in a thickness of 20 μm, and rolled and dried, thereby manufacturing a negative electrode.

A porous separator made of polyethylene (PE) was disposed between a negative electrode and a positive electrode manufactured as described above, thereby manufacturing an electrode assembly. The electrode assembly was inserted into a pouch-type case and an electrode lead was connected thereto. Subsequently, an electrolyte solution including 1 M $LiPF_6$ and ethylene carbonate (EC)/ethyl methyl carbonate (EMC) mixed in a ratio of 1:2 (vol %) was injected thereinto and then sealed, thereby manufacturing a lithium polymer battery.

COMPARATIVE EXAMPLE 1

A lithium polymer battery was manufactured in the same manner as in Example 1, except that electrolytic decomposition using an electrolytic solution of an electrode sheet was not carried out.

COMPARATIVE EXAMPLE 2

A lithium polymer battery was manufactured in the same manner as in Example 1, except that a coating layer was formed to a thickness of 200 nm.

EXPERIMENTAL EXAMPLE 1

In order to confirm cycle characteristics of the lithium polymer batteries manufactured according to Example 1 and Comparative Examples 1 and 2, a charge and discharge test was carried out 100 times. In this regard, charging was carried out under conditions such as a current density of 0.33 C, a charge voltage of 4.2 V, constant current-constant voltage (CC-CV), 5% current cut-off, and the discharge was carried out under conditions such as a discharge current density of 0.33 C, a discharge voltage of 2.5 V, and voltage cut-off. Capacity change ratios for 100 cycles were measured and are summarized in FIG. 2 below.

Referring to FIG. 2, it can be confirmed that the lithium polymer battery according to Example 1, in which aluminum and alumina were coated to a thickness of 10 nm on the positive electrode mix layer, has improved lifespan characteristics and higher reversible capacity, when compared with the lithium polymer battery according to Comparative Example 1 in which a coating layer was not formed on the positive electrode mix layer. On the other hand, it can be confirmed that the lithium polymer battery according to Comparative Example 2 has a thick aluminum and alumina coating layer, when compared with the lithium polymer battery according to Example 1, and improved lifespan characteristics, but an extremely low reversible capacity. This occurs since a thick coating layer dramatically inhibits reaction of an electrode active material coated on a mix layer with an electrolyte solution and migrations of lithium ions, thereby having low capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since, in an electrode for secondary batteries according to the present invention, a coating layer including aluminum (Al) and/or alumina ($Al_2O_3$) is formed on an electrode mix layer, a reaction of an electrode active material with an electrolyte solution under high voltage may be considerably suppressed and conductivity of electrode active material may be improved through Al coating having high conductivity. In addition, Al that easily reacts with oxygen removes oxygen in the electrode to be changed to $Al_2O_3$, and deposition of transition metals included in the electrode active material may be fundamentally prevented.

The invention claimed is:

1. An electrode for secondary batteries, wherein an electrode mix layer comprising an electrode active material is coated on an electrode collector and a coating layer comprising aluminum (Al) metal and alumina ($Al_2O_3$) is formed on the electrode mix layer.

2. The electrode according to claim 1, wherein the coating layer is formed to a thickness of 0.5 nm to 100 nm.

3. The electrode according to claim 1, wherein the aluminum metal and the alumina in the coating layer form a concentration gradient with respect to a thickness direction.

4. The electrode according to claim 3, wherein, in the coating layer, an amount of aluminum metal decreases and an amount of alumina increases, toward a surface portion of the electrode from a side contacting the electrode mix layer.

5. The electrode according to claim 3, wherein, in the coating layer, an amount of aluminum metal decreases and an amount of alumina increases, toward a side contacting the electrode mix layer and a surface portion of the electrode from the center of the coating layer.

6. The electrode according to claim 1, wherein the coating layer is uniformly formed through electrolytic decomposition.

7. The electrode according to claim 6, wherein, in the electrolytic decomposition, an aluminum precursor is ionized in a solution for electrolytic decomposition and is reduced to the aluminum metal in an electrolytic electrode.

8. The electrode according to claim 7, wherein the aluminum precursor is $AlCl_3$.

9. The electrode according to claim 7, wherein the electrolytic decomposition is performed through a catalyst.

10. The electrode according to claim 9, wherein the catalyst is at least one catalyst selected from the group consisting of $ZnCl_2$, $CoCl_2$, $MnCl_2$, $NiCl_2$, and $SnCl_2$-based catalysts.

11. The electrode according to claim 1, wherein the coating layer is partially or entirely formed on a surface of the electrode mix layer.

12. The electrode according to claim 1, wherein the electrode active material comprises a lithium transition metal oxide represented by Formula 1 or 2 below:

$$Li_xM_yMn_{2-y}O_{4-z}A_z \qquad (1),$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and 0.9 <x<1.2, 0<y<2, and 0<z<0.2, $$(1-x)LiM'O_{2-y}A_{y} - xLi_2MnO_{3-y'}A_{y'} \qquad (2),$$

wherein M' is $Mn_aM_b$;

$M_b$ is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and 0<x<1, 0<y≤0.02, 0<y'≤0.02, 0.3≤a≤1.0, 0≤b≤0.7, and a+b=1.

13. The electrode according to claim 1, wherein the electrode is a positive electrode.

14. A method of manufacturing an electrode according to claim 1, the method comprising:

coating an electrode mix comprising an electrode active material on a collector;

preparing a solution comprising an aluminum precursor; and coating aluminum (Al) metal and alumina ($Al_2O_3$) on an electrode mix layer of the coating through electrolytic decomposition using the solution of the preparing.

15. The method according to claim 14, wherein, in the electrolytic decomposition of the coating, an aluminum precursor is ionized in a solution for electrolytic decomposition and is reduced to the aluminum metal in a working electrode.

16. The method according to claim 14, wherein the aluminum precursor is $AlCl_3$.

17. A secondary battery comprising the electrode according to claim 1.

18. The secondary battery according to claim 17, wherein the secondary battery is a lithium ion battery, a lithium ion polymer battery or a lithium polymer battery.

19. A battery module comprising the secondary battery according to claim 17 as a unit cell.

20. A battery pack comprising the battery module according to claim 19.

21. A device comprising the battery pack according to claim 20 as a power source.

22. The device according to claim 21, wherein the device is an electric vehicle, a hybrid electric vehicle, a plug-in hybrid electric vehicle or a system for storing power.

* * * * *